US 10,904,953 B2

(12) United States Patent
Yoon et al.

(10) Patent No.: US 10,904,953 B2
(45) Date of Patent: Jan. 26, 2021

(54) INDUCTION HEATING DEVICE AND METHOD FOR DETERMINING LOADED-OBJECT ON THE INDUCTION HEATING DEVICE

(71) Applicant: LG Electronics Inc., Seoul (KR)

(72) Inventors: Bada Yoon, Seoul (KR); John Kang, Seoul (KR); Wongyu Park, Seoul (KR)

(73) Assignee: LG Electronics Inc., Seoul (KR)

( * ) Notice: Subject to any disclaimer, the term of this patent is extended or adjusted under 35 U.S.C. 154(b) by 260 days.

(21) Appl. No.: 16/030,984

(22) Filed: Jul. 10, 2018

(65) Prior Publication Data
US 2019/0141793 A1     May 9, 2019

(30) Foreign Application Priority Data

Nov. 7, 2017   (KR) .................. 10-2017-0147665

(51) Int. Cl.
*H05B 6/12*     (2006.01)
*H05B 6/06*     (2006.01)
(Continued)

(52) U.S. Cl.
CPC .............. *H05B 6/06* (2013.01); *H02M 7/539* (2013.01); *H05B 1/02* (2013.01); *H05B 6/062* (2013.01);
(Continued)

(58) Field of Classification Search
CPC . H05B 6/04; H05B 6/06; H05B 6/062; H05B 6/065; H05B 6/1236; H05B 6/1272;
(Continued)

(56) References Cited

U.S. PATENT DOCUMENTS 4,810,847 A     3/1989 Ito
2007/0125768 A1     6/2007 Kim et al.
(Continued)

FOREIGN PATENT DOCUMENTS

EP     2533605     12/2012
EP     2645814     10/2013
(Continued)

OTHER PUBLICATIONS

Extended European Search Report in European Application No. 18201726.9, dated Apr. 9, 2019, 7 pages.

*Primary Examiner* — Hung D Nguyen
(74) *Attorney, Agent, or Firm* — Fish & Richardson P.C.

(57) ABSTRACT

An induction heating device includes a working coil, an inverter, an inverter driving unit configured to apply a switching signal to the inverter to enable the inverter to perform a switching operation, a control unit configured to generate and apply a control signal to the inverter driving unit to cause the inverter driving unit to generate the switching signal based on the control signal, and a determination unit configured to determine a type of an object disposed on the induction heating device based on (i) a first resonant current value measured from the working coil in response to operation of the inverter by the switching signal having a first operation frequency and (ii) a second resonant current value measured from the working coil in response to operation of the inverter by the switching signal having a second operation frequency.

20 Claims, 5 Drawing Sheets

(51) Int. Cl.
*H02M 7/539* (2006.01)
*H05B 1/02* (2006.01)
*H05B 6/08* (2006.01)

(52) U.S. Cl.
CPC ...... *H05B 2206/02* (2013.01); *H05B 2213/05* (2013.01)

(58) Field of Classification Search
CPC ........ H05B 6/62; H05B 1/02; H05B 2213/03; H05B 2213/05; H05B 2213/07; H05B 2206/02; H02M 7/539
USPC ....... 219/620, 621, 625, 626, 660, 663, 664, 219/665
See application file for complete search history.

(56) References Cited

U.S. PATENT DOCUMENTS

| | | | |
|---|---|---|---|
| 2012/0152935 A1 | 6/2012 | Kitaizumi et al. | |
| 2012/0305546 A1* | 12/2012 | Filippa | H05B 6/062 219/660 |
| 2015/0250027 A1* | 9/2015 | Takano | H05B 6/062 219/664 |

FOREIGN PATENT DOCUMENTS

| | | |
|---|---|---|
| JP | 2016042431 | 2/2013 |
| JP | 2013026105 | 3/2016 |
| KR | 100661226 | 12/2006 |

* cited by examiner

INDUCTION HEATING DEVICE AND METHOD FOR DETERMINING LOADED-OBJECT ON THE INDUCTION HEATING DEVICE

CROSS-REFERENCE TO RELATED APPLICATIONS

This application claims priority to and the benefit of Korean Patent Application No. 10-2017-0147665, filed on Nov. 7, 2017, the disclosure of which is incorporated herein by reference in its entirety.

TECHNICAL FIELD

The present disclosure relates to an induction heating device and a method for detecting an object on the induction heating device.

BACKGROUND

A cooking device may use various heating methods to heat food. For example, gas ranges uses gas as fuel. In some examples, a cooking device uses electricity to heat a cooking vessel such as a pot.

A method for heating an object using electricity may be divided into a resistive heating type and an inductive heating type. In the electrical resistive heating method, heat is generated when current flows through a metal resistance wire or a non-metallic heating element such as silicon carbide, and transmitted to the loaded object through radiation or conduction, thereby heating the loaded object. In the inductive heating method, when a high-frequency power of a predetermined magnitude is applied to the working coil, an eddy current is generated in the loaded object made of a metal by using a magnetic field generated around the working coil so that the loaded object itself is heated.

In some examples of induction heating, based on power being applied to the induction heating device, a high-frequency voltage of a predetermined magnitude is applied to the working coil. As a result, an inductive magnetic field is generated around the working coil disposed in the induction heating device. When the flux of the generated inductive magnetic field passes through a bottom of the loaded object containing the metal as loaded on the induction heating device, an eddy current is generated inside the bottom of the loaded object. When the resulting eddy current flows in the bottom of the loaded object, the loaded object itself is heated.

In some cases, there is a restriction in a type of the loaded object on the induction heating device. For example, the object in which eddy current is generated when high-frequency power is supplied to the coil of the induction heating device may be used on the induction heating device. That is, loaded-objects with magnetic properties may be used on a cooker for induction heating.

In some cases, it is difficult for the user to determine solely from the appearance of the loaded-object whether or not the loaded-object is a loaded-object working on the inductively-heated device. Further, the user may load an object that does not work on the induction heating device and apply power to the induction heating device, which causes unnecessary power consumption.

SUMMARY

The present disclosure provides an induction heating device capable of more accurately determining a type of a loaded-object placed on the induction heating device, and a method for determining the type of the loaded-object by the induction heating device.

The purposes of the present disclosure are not limited to the above-mentioned purposes. Other purposes and advantages of the present disclosure, as not mentioned above, may be understood from the following descriptions and more clearly understood from the implementations of the present disclosure. Further, it will be readily appreciated that the objects and advantages of the present disclosure may be realized by features and combinations thereof as disclosed in the claims.

According to one aspect of the subject matter described in this application, an induction heating device includes a working coil, an inverter configured to apply current to the working coil based on a switching operation of the inverter, an inverter driving unit configured to apply a switching signal to the inverter to enable the inverter to perform the switching operation, the switching signal having a first operation frequency and a second operation frequency, a control unit that is configured to generate a control signal, that is configured to apply the control signal to the inverter driving unit, and that is configured to cause the inverter driving unit to generate the switching signal based on the control signal, and a determination unit configured to determine a type of an object disposed on the induction heating device based on (i) a first resonant current value that is measured from the working coil in response to operation of the inverter by the switching signal having the first operation frequency and (ii) a second resonant current value that is measured from the working coil in response to operation of the inverter by the switching signal having the second operation frequency.

Implementations according to this aspect may include one or more of the following features. For example, the determination unit may be further configured to compare the first resonant current value to a first reference value, and based on a comparison result, determine presence of the object on the induction heating device or absence of the object from the induction heating device. In some implementations, the determination unit may be further configured to compare the first resonant current value to a second reference value, and based on a comparison result, determine whether the object on the induction heating device has an inductive-heating property.

In some implementations, the determination unit may be further configured to, based on the first resonant current value, determine that the object has an inductive-heating property, and, in response to a determination that the object has the inductive-heating property based on the first resonant current value, confirm whether the object has the inductive-heating property based on the second resonant current value. In some examples, the determination unit may be further configured to, in response to a determination that the object has the inductive-heating property based on the first resonant current value, compare a difference between the first resonant current value and the second resonant current value to a third reference value.

In some implementations, the control unit may be further configured to, based on the determination unit determining absence of the object from the induction heating device, stop supplying the control signal to the inverter driving unit. In some examples, the control unit may be further configured to, based on the determination unit determining that the object on the induction heating device does not have the inductive-heating property, stop supplying the control signal to the inverter driving unit. In some examples, the determination unit may be further configured to determine that the object has the inductive-heating property based on the difference between the first resonant current value and the second resonant current value being less than the third reference value.

In some implementations, the induction heating device may further include a sensor connected to the determination unit and configured to measure a resonant current from the working coil based on operation of the inverter driving unit.

According to another aspect, a method for detecting and identifying an object disposed on an induction heating device includes operating an inverter of the induction heating device at a first operation frequency, measuring a first resonant current value from a working coil based on operation of the inverter at the first operation frequency, based on the first resonant current value, determining at least one of presence of the object on the induction heating device, absence of the object from the induction heating device, or a type of the object on the induction heating device, operating the inverter of the induction heating device at a second operation frequency, measuring a second resonant current value from the working coil based on operation of the inverter at the second operation frequency, and determining the type of the object based on the second resonant current value.

Implementations according to this aspect may include one or more of the following features. For example, determining at least one of presence of the object, absence of the object, or the type of the object includes comparing the first resonant current value to a first reference value, and based on a comparison result, determining presence of the object on the induction heating device or absence of the object from the induction heating device. In some examples, determining at least one of presence of the object, absence of the object, or the type of the object includes comparing the first resonant current value to a second reference value, and based on a comparison result, determining whether the object on the induction heating device has an inductive-heating property.

In some implementations, determining the type of the object based on the second resonant current value includes based on the first resonant current value, determining that the object on the induction heating device has an inductive-heating property, and in response to a determination that the object has the inductive-heating property based on the first resonant current value, confirming whether the object has the inductive-heating property based on the second resonant current value. In some examples, confirming whether the object has the inductive-heating property based on the second resonant current value includes comparing a difference between the first resonant current value and the second resonant current value to a third reference value.

In some implementations, determining presence or absence of the object on the induction heating device may include determining presence of the object based on the first resonant current value being greater than or equal to the first reference value, determining absence of the object based on the first resonant current value being less than the first reference value, and based on the first resonant current being between the first reference value and the second reference value, determining that the object is present on the induction heating device and that the object has the inductive-heating property, where the second reference value is greater than the first reference value.

In some implementations, operating the inverter of the induction heating device at the second operation frequency includes operating the inverter of the induction heating device at the second operation frequency in response to a determination that the first resonant current value being less than the second reference value.

In some implementations, the method may further include operating the inverter of the induction heating device based on a confirmation that the object has the inductive-heating property. In some implementations, the method may further include determining that the object has the inductive-heating property based on the difference between the first resonant current value and the second resonant current value being less than the third reference value.

In some implementations, the method may further include restricting operation of the inverter based on a determination of absence of the object from the induction heating device. In some implementations, the method may further include restricting operation of the inverter based on a determination that the object on the induction heating device does not have the inductive-heating property.

According to the present disclosure, to more accurately determine a type of loaded-object placed on the induction heating device, a first resonant current value is measured, where the first value is a magnitude of a resonant current flowing through a working coil when the induction heating device operates at a first operating frequency. Next, a second resonant current value is measured, where the second value is a magnitude of a resonant current flowing through the working coil when the induction heating device operates at a second operating frequency.

Then, according to the present disclosure, the first resonant current value is compared to the second resonant reference value. Based on this comparison result, it is determined whether an object exists on a heating-region of the induction heating device. That is, it is determined whether there is a load on the heating-region.

Further, according to the present disclosure, the first resonant current value is compared to the second resonant reference value. Based on the result of the comparison, it is firstly determined whether the loaded-object placed on the heating-region of the induction heating device is an object having an inductive-heating property.

Further, according to the present disclosure, the loaded-object determined as the object with the inductive-heating property from the first determination is subjected to a second determination using the second resonant current value. For example, a difference between the first resonant current value and the second resonant current value of the loaded-object as determined as an object having the inductive-heating property from the first determination is compared with a predetermined reference value. Thus, it is finally determined, based on the result of the comparison, whether the loaded-object as determined from the first determination, to have an inductive-heating property is correctly an object having an inductive-heating property.

According to the present disclosure, the double determination process allows more accurately determining whether the loaded-object placed on the heating-region of the induction heating device is actually an object with an inductive-heating property.

According to the present disclosure, it is advantageous to more accurately determine the type of the loaded-object placed on the induction heating device.

DETAILED DESCRIPTIONS

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Figure 1:
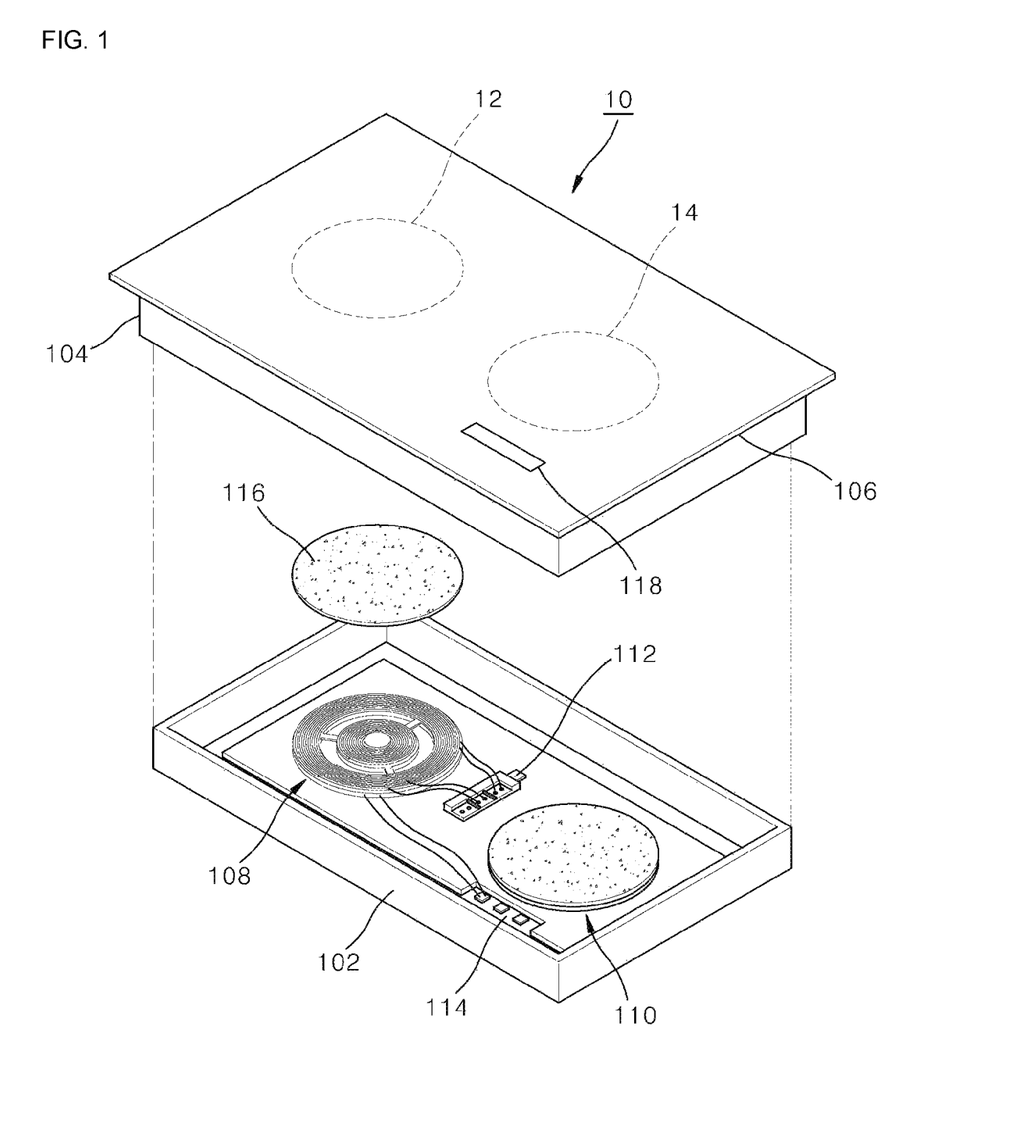
FIG. 1 is a schematic representation of an example induction heating device.

FIG. 1 is a schematic representation of an example of an inductively-heated device.

In the example shown in FIG. 1, an induction heating device 10 includes a casing 102 as a main body, and a cover plate 104 coupled to the casing 102 to seal the casing 102.

The cover plate 104 is engaged with a top open face of the casing 102 to block a space defined inside the casing 102 from the outside. The cover plate 104 includes a loading plate 106 on which a loaded-object, such as a container for cooking food, may be placed. In one implementation of the present disclosure, the loading plate 106 may be made of a tempered glass material, such as a ceramic glass.

The loading plate 106 has heating regions 12 and 14 defined therein position-corresponding to working coil assemblies 108 and 110, respectively. In order for the user to be able to clearly recognize the positions of the heating-regions 12 and 14, lines or figures corresponding to the heating-regions 12 and 14 may be formed on the loading plate 106.

Referring to FIG. 1, in the space formed inside the casing 102, working coil assemblies 108 and 110 for heating the loaded object are disposed. Further, inside the casing 102, there is provided an interface 114 having a function of allowing a user to apply power, a function of allowing a user to control the output of the working coil assembles 108 and 110, and a function of displaying information related to the induction heating device 10. The interface 114 may be implemented as a touch panel capable of both information input and information display via touch. However, the present disclosure is not limited thereto. In some implementations, an interface 114 having a different configuration may be used.

Further, the loading plate 106 is provided with a manipulation region 118 disposed at a position corresponding to the interface 114. For manipulation by the user, the manipulation region 118 may be pre-printed with characters, images, or the like. The user may perform a desired manipulation by touching a specific point in the manipulation region 118 corresponding to the preprinted character or image. Further, the information output from the interface 114 may be displayed through the loading plate 106.

Further, in the space formed inside the casing 102, a power supply 112 for supplying power to the working coil assemblies 108 and the interface 114 are disposed.

In the implementation of FIG. 1, the two working coil assemblies 108 and 110 are shown inside the casing 102. In another implementation of the present disclosure, one working coil assembly may be disposed within the casing 102, or three or more working coil assemblies may be disposed.

Each of the working coil assemblies 108 and 110 may include a working coil that generates an inductive magnetic field using a high frequency alternating current supplied thereto by a power supply 112, and a thermal insulating sheet 116 for protecting the coil from heat generated by the loaded object. In some implementations, the thermal insulating sheet 116 may be omitted.

In some implementations, a control unit may be disposed in the space formed inside the casing 102. The control unit receives a user command via the interface 114 and controls the power supply 112 to activate or deactivate the power supply to the working coil based on the user command.

Figure 2:
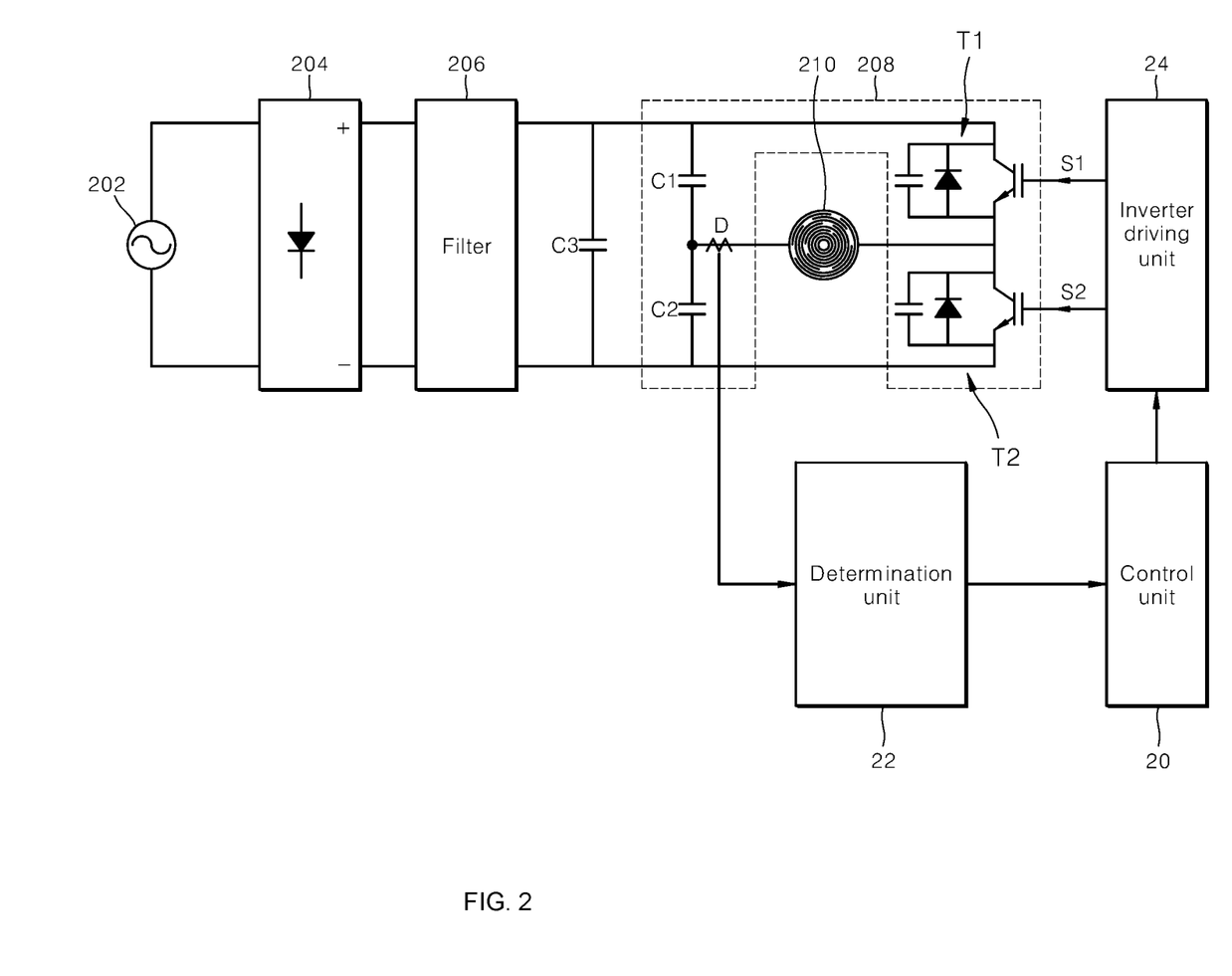
FIG. 2 illustrates an example internal circuit configuration of the induction heating device.

FIG. 2 illustrates an example internal circuit configuration of the induction heating device.

The internal circuit of the induction heating device may include a rectifying unit 204, a filter 206, a determination unit 22, an inverter 208, an inverter driving unit 24, and a control unit 20.

The rectifying unit 204 rectifies AC power supply supplied from an input power supply 202 and outputs the rectified current. The rectifying unit 204 may include one or more diodes for rectifying operations, such as bridge diodes and/or an inductor. In some implementations, a converter circuit with a switching element may be used instead of the rectifying unit 204.

The filter 206 removes a ripple component remaining in the voltage output from the rectifying unit 204. In some implementations, filter 206 may be omitted. Further, a smoothing capacitor C3 may smooth the voltage output from the filter 206 and generates the smoothed DC voltage.

The inverter 208 converts the DC voltage output from the smoothing capacitor C3 into an AC voltage via a switching operation by switching elements T1 and T2. The inverter 208 may include one or more switching elements T1 and T2 for performing the switching operation. The switching elements T1 and T2 may be turned on and off complementarily with each other via switching signals S1 and S2 generated by the inverter driving unit 24. The complementary turn-on and turn-off operations of the switching elements T1 and T2 may be called the switching operations. The switching elements T1 and T2 of the inverter 208 may be respectively connected in parallel with corresponding capacitors C2 and C3.

The AC current generated by the inverter 208 is applied to the working coil 210. The working coil 210 generates resonance according to the application of the alternating current thereto. This resonance causes a resonant current to flow through the working coil 210.

The inverter driving unit 24 outputs the switching signals S1 and S2 in response to a control signal output from the control unit 20. The number of switching times per unit time by which the switching elements T1 and T2 are complementarily turned on and off via the switching signals S1 and S2 as output by the inverter driving unit 24, that is, the operating frequency of the inverter 208 may vary depending on the control signal.

The control unit 20 generates the control signal based on a predetermined operating frequency and supplies the control signal to the inverter driving unit 24. In one implementation of the present disclosure, the control unit 20 may set the operating frequency to a first operating frequency or a second operating frequency that are different from each other for the loaded-object type determination by the determination unit 22.

The determination unit 22 determines, based on a resonant current value of the working coil 210 as measured by a sensor D, whether a loaded-object exists on the heating-region 12 and/or 14, and determines a type of the loaded-object placed on the regions. The determination unit 22 may deliver the determination result about the loaded-object presence or absence and the loaded-object type to the control unit 20.

In some implementations, when the inverter 208 operates at the first operating frequency, the sensor D measures a magnitude of the resonant current flowing in the working coil 210, i.e., a first resonant current value. The determination unit 22 receives the first resonant current value from the sensor. Further, when inverter 208 operates at the second operating frequency, the sensor D measures a magnitude of the resonant current flowing in the working coil 210, i.e., the second resonant current value. The determination unit 22 receives the second resonant current value from the sensor. Then, the determination unit 22 may determine, based on the measured first resonant current value and second resonant current value, the presence or absence of the loaded-object, and the type of the loaded-object.

In some implementations, the determination unit 22 compares the first resonant current value to a first reference value, and determines, based on the result of the comparison, whether a loaded-object is present on the heating-region 12 and/or 14. For example, if the first resonant current value is greater than or equal to the first reference value, the determination unit 22 determines that the loaded-object exists on the heating-region 12 and/or 14. The state that the loaded-object is present on the heating-region 12 and/or 14 corresponds to a load state. However, if the first resonant current value is less than the first reference value, the determination unit 22 determines that no loaded-object exists on heating-region 12 and/or 14. The absence of the loaded-object on the heating-region 12 and/or 14 may correspond to a no-load state.

In some implementations, the determination unit 22 compares the first resonant current value to a second reference value. Then, based on the result of the comparison, the determination unit 22 first determines whether the loaded-object placed on the heating-region 12 and/or 14 is an object having an inductive-heating property.

For example, when the first resonant current value for the loaded-object placed on the heating-region 12 and/or 14 is less than the second reference value, the determination unit 22 determines that the loaded-object placed on the heating-region 12 and/or 14 is a loaded-object with induction heating property. However, if the first resonant current value for the loaded-object placed on heating-region 12 and/or 14 is greater than or equal to the second reference value, the determination unit 22 determines that the loaded-object placed on the heating-region 12 and/or 14 is an object without induction heating property.

In some implementations, the determination unit 22 re-determines, based on the second resonant current value, whether the loaded-object as determined from the first determination based on the first resonant current value, to have the inductive-heating property, is really an object with an inductive-heating property.

In some implementations, the determination unit 22 may calculate a difference between the first resonant current value and second resonant current value for the loaded-object as determined from the first determination based on the first resonant current value, to have the inductive-heating property. The determination unit 22 then compares the calculated difference with a third reference value. If the calculated difference is smaller than the third reference value, the determination unit 22 may confirm that the loaded-object as determined from the first determination based on the first resonant current value, to have the inductive-heating property, is really an object with an inductive-heating property. If the calculated difference is greater than or equal to the third reference value, the determination unit 22 may confirm that the loaded-object as determined from the first determination based on the first resonant current value, to have the inductive-heating property, is an object without an inductive-heating property.

The control unit 20 may determine whether to perform a heating operation based on the determination result as transmitted from the determination unit 22.

For example, if the determination unit 22 determines that the loaded-object is absent on the heating-region 12 and/or 14 (that is, determines the no-load state), the control unit 20 may stop supplying the control signal to the inverter driving unit 24, not to perform the heating operation.

Further, when the determination unit 22 determines that the loaded-object has existed on the heating-region 12 and/or 14, but determines that the loaded-object placed on the heating-region 12 and 14 is an object without an inductive-heating property, the control unit 20 may stop supplying the control signal to the inverter driving unit 24, not to perform the heating operation. Conversely, when the determination unit 22 determines that the loaded-object has existed on the heating-region 12 and/or 14, and further determines that the loaded-object placed on the heating-region 12 and 14 is an object with an inductive-heating property, the control unit 20 generates a control signal for allowing the resonant current of a magnitude corresponding to a heating power set by the user to flow in the working coil 210 and transmits the generated control signal to the inverter driving unit 24.

Figure 3:
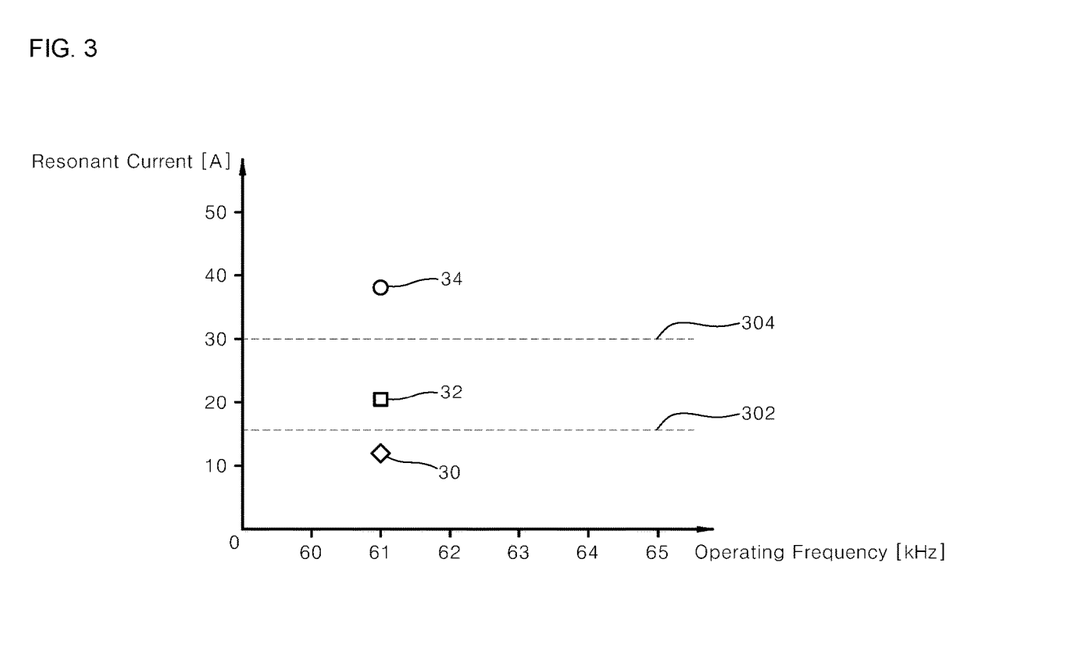
FIG. 3 illustrates an example of resonant current values in a working coil as measured when the induction heating device operates at a first operating frequency.

FIG. 3 is a graph showing an example of resonant current values of the working coil as measured when the induction heating device operates at the first operating frequency.

First, the control unit 20 sets the operating frequency of the inverter 208 to the first operating frequency, e.g., 61 kHz, and outputs a corresponding control signal. In response to supply of the control signal, the switching signal is outputted from the inverter driving unit 24. Thus, a current is generated by the inverter 208, and, as a result of the current, a resonant current is generated in the working coil 210.

When the inverter 208 operates at the first operating frequency, the determination unit 22 allows the sensor D to measure the first resonant current value as the magnitude of the resonant current flowing in the working coil 210.

In FIG. 3, with the first operating frequency being set to 61 kHz, following measurements are shown: a first resonant current value 30 as measured in the no-load state where there is no loaded-object on the heating-region; a first resonant current value as measured when an object with inductive-heating property is present on the heating-region 12; and a first resonant current value as measured when there is an object without the inductive-heating property on the heating-region.

The determination unit 22 first compares the first resonant current value 30 measured in FIG. 3 with a predetermined first reference value 302. Then, the determination unit determines based on the comparison result whether a loaded-object exists on the heating-region. As shown in FIG. 3, when the first resonant current value 30 is lower than the first reference value 302, the determination unit 22 determines the no-load state in which the loaded-object does not exist on the heating-region. If the first resonant current values 32 and 34 are higher than the first reference value 302, the determination unit 22 determines that the loaded-object exists on the heating-region.

Next, the determination unit 22 compares the first resonant current values 32 and 34 to a predetermined second reference value 304 for the loaded-object as previously determined to be present on the heating-region. As shown in FIG. 3, when the first resonant current value 32 is lower than the second reference value 304, the determination unit 22 first determines that the corresponding loaded-object is an object having an inductive-heating property. However, when the first resonant current value 34 is higher than the second reference value 304, the determination unit 22 determines the corresponding loaded-object as an object that does not have an inductive-heating property.

However, only the comparison between the first resonant current value and the second reference value as described above may not accurately distinguish between the object having the inductive-heating property and the object having no inductive-heating property. This is because when the same loaded-object is placed on the heating-region, the magnitude of the resonant current flowing in the working coil 210 according to the driving of the inverter 208 may vary depending on various factors.

In some implementations, induction heating devices produced using the same component and the same process may have tolerances in terms of electrical characteristics of components used in each device, such as resistors, working coils, switching elements, or in terms of assembly or placement between these components. Due to such tolerances, the resonant currents flowing through the working coils 210 may represent different magnitudes between the induction heating devices. Further, changes in the electrical and physical properties of these components may occur in the same induction heating device over time.

Further, when the user places the same loaded-object on the heating-region, the location of the loaded-object placed on the heating-region may vary slightly between one measurement and another measurement. Due to such the position variation, the magnitude of the resonant current flowing through the working coil 210 may be changed even if the inverter 208 operates at the same operating frequency.

Due to the various factors as described above, using only the first resonant current value may not allow accurately distinguishing between the object having the inductive-heating property and the object having no inductive-heating property.

Figure 4:
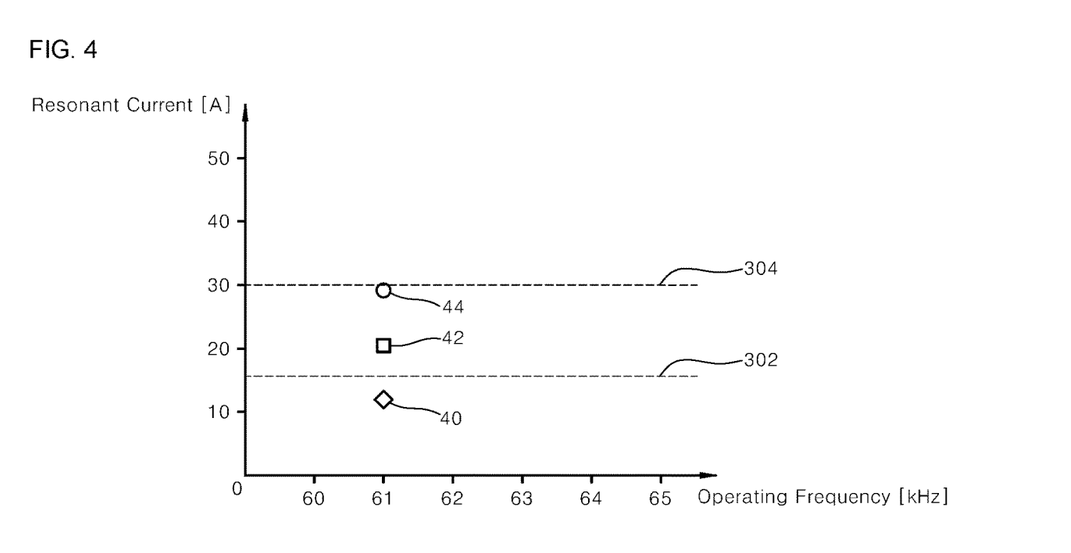
FIG. 4 illustrates an example of resonant current values in the working coil using the loaded-object and induction heating device of in FIG. 3, and an example of a difference in resonant current values in FIG. 3 and FIG. 4 observed for an object that does not have an inductive heating property.

FIG. 4 is a graph showing an example of resonant current values in the working coil as measured using the same loaded-object and induction heating device as in FIG. 3. In this example shown in FIG. 4, the resonant current value for an object that does not have an inductive heating property shows a difference from the resonant current values in FIG. 3.

As shown in FIG. 4, using the same loaded-object and induction heating device as in FIG. 3, following values are measured at the same operating frequency as in FIG. 3: a first resonant current value 40 in a non-load state, a first resonant current value 42 for an object with an inductive-heating property, and a first resonant current value 44 for an object without the inductive-heating property. In this connection, the first resonant current value 40 in a non-load state and the first resonant current value 42 for an object with an inductive-heating property are substantially respectively similar to the first resonant current value 30 in the unloaded state as shown in FIG. 3 and the first resonant current value 32 for the object with the inductive heating property as shown in FIG. 3. However, due to the various factors as mentioned above, for example, the changes in the electrical and physical properties of the components, or the changes in the location of the loaded-object on the heating-region between the measurements, the first resonant current value 44 for an object without the inductive-heating property may greatly decrease. When the first resonant current value 44 for an object having no inductive-heating property is greatly reduced and thus becomes lower than the predetermined second reference value, the determination only based on the comparison between the first resonant current value and the second reference value by the determination unit 22 may lead to the erroneous determination in which an object having no inductive-heating property is determined to be an object having the inductive-heating property. This is shown in FIG. 4.

Therefore, according to the present disclosure, the second determination using the second resonant current value may be further performed to prevent the erroneous determination as described above and more accurately determine the type of loaded-object.

Figure 5:
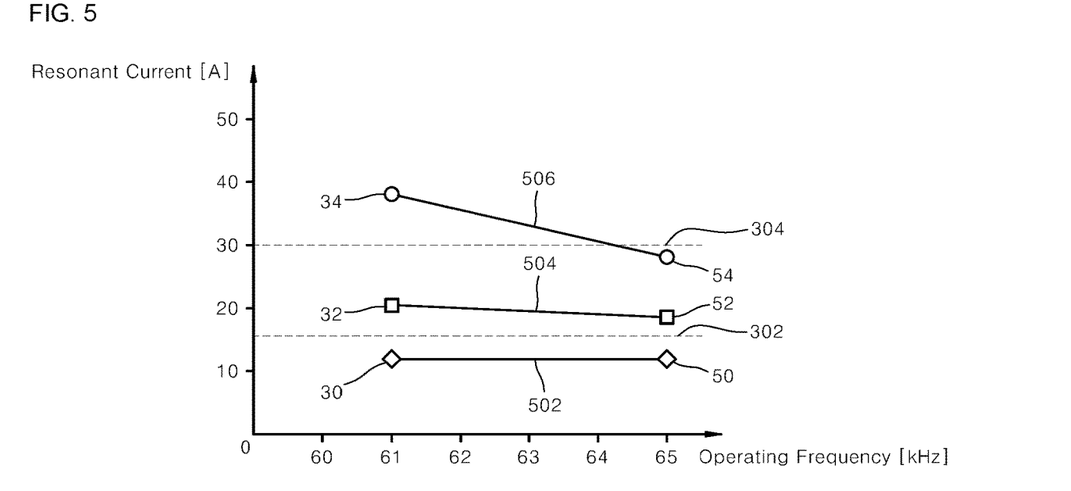
FIG. 5 illustrates an example of resonant current values in the working coil when the induction heating device operates at a first operating frequency and a second operating frequency.

FIG. 5 is a graph showing an example of measured resonant current values in the working coil when the induction heating device operates at a first operating frequency and a second operating frequency.

As shown in FIG. 5, first, the control unit 20 sets the operating frequency of the inverter 208 to the first operating frequency, e.g., 61 kHz, and outputs a corresponding control signal. In response to the control signal, the switching signal is outputted from the inverter driving unit 24. Thus, current is generated by the inverter 208, and, as a result, a resonant current is generated in the working coil 210.

When the inverter 208 operates at the first operating frequency, the determination unit 22 allows the sensor D to measure the first resonant current value as the magnitude of the resonant current flowing in the working coil 210. With reference to FIG. 5, with the first operating frequency being set to 61 kHz, following measurements are shown: a first resonant current value 30 as measured in the no-load state where there is no loaded-object on the heating-region; a first resonant current value as measured when an object with inductive-heating property is present on the heating-region 12; and a first resonant current value as measured when there is an object without the inductive-heating property on the heating-region.

The determination unit 22 first compares the first resonant current value 30 measured in FIG. 5 with a predetermined first reference value 302. Then, the determination unit determines based on the comparison result whether a loaded-object exists on the heating-region. As shown in FIG. 5, when the first resonant current value 30 is lower than the first reference value 302, the determination unit 22 determines the no-load state in which the loaded-object does not exist on the heating-region. Conversely, if the first resonant current values 32 and 34 are higher than the first reference value 302, the determination unit 22 determines that the loaded-object exists on the heating-region. Next, the determination unit 22 compares the first resonant current values 32 and 34 to a predetermined second reference value 304 for the loaded-object as previously determined to be present on the heating-region.

As shown in FIG. 3, when the first resonant current value 32 is lower than the second reference value 304, the determination unit 22 first determines that the corresponding loaded-object is an object having an inductive-heating property. However, when the first resonant current value 34 is higher than the second reference value 304, the determination unit 22 determines the corresponding loaded-object as an object that does not have an inductive-heating property. This determination process may be the first determination process.

Then, the control unit 20 sets the operating frequency of the inverter 208 to the second operating frequency, e.g., 65 kHz, and outputs a corresponding control signal. In response to the control signal, the switching signal is outputted from the inverter driving unit 24. Thus, current is generated by the inverter 208, and, as a result, a resonant current is generated in the working coil 210.

When the inverter 208 operates at the second operating frequency, the determination unit 22 allows the sensor D to measure the second resonant current value as the magnitude of the resonant current flowing in the working coil 210.

The determination unit 22 then calculates a difference between the previously measured first resonant current value and the currently measured second resonant current value, i.e., a change amount from the first resonant current value to the second resonant current value. As shown in FIG. 5, the difference between the first resonant current value and the second resonant current value may be expressed as slopes 502, 504 and 506 between the first resonant current value and the second resonant current value.

The determination unit 22 compares the calculated difference between the first resonant current value and the second resonant current value with a predetermined third reference value. Based on the comparison result, the determination unit finally re-determines the type of the loaded-object as determined to have the inductive heating property from the first determination using the first resonant current value, which is performed previously. This re-determination may be the second determination.

For instance, the first resonant current value 32 for an object with an inductive heating property is 23A, and the second resonant current value 52 is measured to be 22A for the object with the inductive heating property. For the object with the inductive-heating property, a calculated difference between the first resonant current value 32 and the second resonant current value 52 is 1A. Further, the first resonant current value 34 for an object without an inductive heating property is 38 A, and the second resonant current value 54 is measured to be 32A for the object without the inductive heating property. For the object without the inductive-heating property, a calculated difference between the first resonant current value 34 and the second resonant current value 54 is 6A.

The determination unit 22 compares the calculated difference between the first resonant current value and the second resonant current value for the loaded-objects with the predetermined third reference value, e.g., 3A. Based on the comparison result, the determination unit finally determines that the loaded-object corresponding to the first resonant current value 32 and the second resonant current value 52 is actually the object having the inductive-heating property. Conversely, the determination unit finally determines the loaded-object corresponding to the first resonant current value 34 and the second resonant current value 54 as an object having no inductive-heating property.

In this way, according to the present disclosure, the object having the inductive-heating property may be reliably confirmed. The reliable conformation of the loaded-object having the object having the inductive-heating property using the first resonant current value and the second resonant current value is associated with the fact that as the operating frequency of the induction heating device increases, the magnitude of the resonant current generated in the working coil decreases.

The decrease in the magnitude of the resonant current when the operating frequency is increased is enhanced in an object not having the inductive-heating property, for example, the object made of an aluminum material not containing a magnetic material compared to an object having the inductive-heating property, such as, a magnetic material-containing object, for example, clad or Analon. In other words, the difference between the first resonant current value and the second resonant current value is relatively increased in the object (difference as shown in 506) having no inductive-heating property, as compared to the object (difference as shown in 504) having the inductive-heating property. Further, in the unloaded state, the difference 502 between the first resonant current value and the second resonant current value is close to zero as shown in FIG. 5.

Thus, even when the first resonant current value or the second resonant current value are somewhat variable, depending on change in the electrical and physical characteristics of the components illustrated above and change in the location of the loaded-object between measurements as described above, an object having the inductive-heating property and an object having no inductive-heating property may be accurately distinguished therebetween by performing the second determination based on the difference between the first resonant current value and the second resonant current value.

Figure 6:
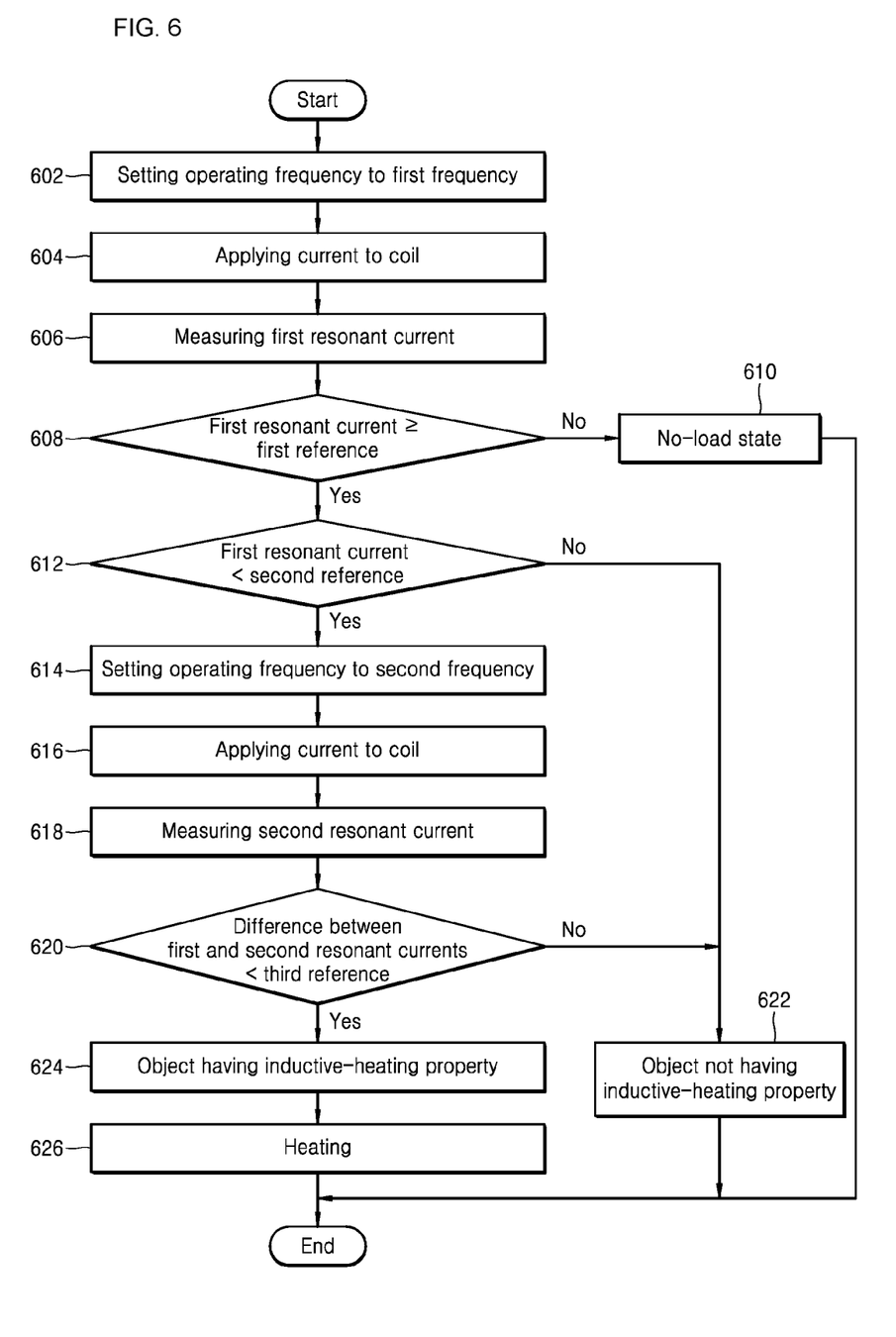
FIG. 6 is a flow diagram of an example loaded-object determination method by an induction heating.

FIG. 6 is a flow diagram of an example of a loaded-object determination method by an induction heating device.

Referring to FIG. 6, first, the control unit 20 sets the operating frequency of the inverter 208 to the first operating frequency (602). Then, the control unit outputs a control signal corresponding to the first operating frequency such that the inverter 208 is operated to apply current to the working coil 210 (604).

Then, the determination unit 22 allows the sensor D to measure the first resonant current value as the magnitude of the resonant current flowing in the working coil 210 when the inverter 208 operates at the first operating frequency (606).

Next, the determination unit 22 first compares the first resonant current value measured above with a predetermined first reference value (608). Then, the determination unit determines based on the comparison result whether a loaded-object exists on the heating-region. When the first resonant current value is lower than the first reference value, the determination unit 22 determines the no-load state in which the loaded-object does not exist on the heating-region (610). Thus, the control unit may not perform heating operation.

If the first resonant current value is higher than the first reference value, the determination unit 22 determines that the loaded-object exists on the heating-region, and, next, the determination unit 22 compares the first resonant current value to a predetermined second reference value for the loaded-object as previously determined to be present on the heating-region (612). When the first resonant current value 34 is higher than or equal to the second reference value, the determination unit 22 determines the corresponding loaded-object as an object that does not have an inductive-heating property (622). Thus, the control unit may not perform heating operation.

When the first resonant current value is lower than the second reference value, the determination unit determines that the corresponding loaded-object is an object having an inductive-heating property, and, then, the control unit 20 sets the operating frequency of the inverter 208 to the second operating frequency (614). Then, the control unit 20 outputs a corresponding control signal, such that, in response to the control signal, the switching signal is outputted from the inverter driving unit, and, thus, current is generated by the inverter 208, and, as a result, a resonant current is generated in the working coil 210 (616).

Subsequently, the determination unit 22 allows the sensor D to measure the second resonant current value as the magnitude of the resonant current flowing in the working coil 210 when the inverter 208 operates at the second operating frequency (618).

Thereafter, the determination unit 22 calculates a difference between the previously measured first resonant current value and the currently measured second resonant current value, i.e., a change amount from the first resonant current value to the second resonant current value, and, then, the determination unit 22 compares the calculated difference between the first resonant current value and the second resonant current value with the predetermined third reference value (620). In this connection, when the difference is greater than or equal to the predetermined third reference value, the determination unit 22 finally determines that the loaded-object is the object not having the inductive-heating property (622). Thus, the control unit may not perform heating operation.

When the difference is lower than the predetermined third reference value, the determination unit 22 finally determines that the loaded-object is actually the object having the inductive-heating property (624). Thus, the control unit 20 generates a control signal for allowing the resonant current of a magnitude corresponding to a heating power set by the user to flow in the working coil 210 and transmits the generated control signal to the inverter driving unit 24 (626).

In one implementation, the determination unit 22 compares the second resonant current value to a predetermined fourth reference value. If the second resonant current value is lower than the fourth reference value, the determining unit 22 may determine that the loaded-object placed on the heating-region is actually an object having an inductive-heating property.

In some implementations, when the first resonant current value is greater than the first reference value and the second reference value, and, further, when the difference between the first resonant current value and the second resonant current value is greater than the third reference value, the determining unit 22 may eventually determine that the loaded-object placed on the heating-region is actually an object having an inductive-heating property. On the other hand, when the first resonant current value is greater than or equal to the first reference value and is lower than the second reference value, and, further, when the difference between the first resonant current value and the second resonant current value is lower than the third reference value, the determining unit 22 may eventually determine that the loaded-object placed on the heating-region is an object not having an inductive-heating property.

In this way, the type of loaded-object placed on the heating-region may be more accurately determined by the double determination process using the first resonant current value and the second resonant current value.

In the above description, numerous specific details are set forth in order to provide a thorough understanding of the present disclosure. The present disclosure may be practiced without some or all of these specific details. Examples of various implementations have been illustrated and described above. It will be understood that the description herein is not intended to limit the claims to the specific implementations described. It is intended to cover alternatives, modifications, and equivalents as may be included within the spirit and scope of the present disclosure as defined by the appended claims.

What is claimed is:

1. An induction heating device, comprising:
   a working coil;
   an inverter configured to apply current to the working coil based on a switching operation of the inverter;
   an inverter driving unit configured to apply a switching signal to the inverter to enable the inverter to perform the switching operation, the switching signal having a first operation frequency and a second operation frequency;
   a control unit that is configured to generate a control signal, that is configured to apply the control signal to the inverter driving unit, and that is configured to cause the inverter driving unit to generate the switching signal based on the control signal; and
   a determination unit configured to:
      determine a type of an object disposed on the induction heating device based on (i) a first resonant current value that is measured from the working coil in response to operation of the inverter by the switching signal having the first operation frequency and (ii) a second resonant current value that is measured from the working coil in response to operation of the inverter by the switching signal having the second operation frequency,
      based on the first resonant current value, determine whether the object has an inductive-heating property, and
      in response to a determination that the object has the inductive-heating property based on the first resonant current value, compare a difference between the first resonant current value and the second resonant current value to a reference value to confirm that the object has the inductive-heating property.

2. The induction heating device of claim 1, wherein the determination unit is further configured to:
   compare the first resonant current value to a first reference value; and
   based on a comparison of the first resonant current value to the first reference value, determine presence of the object on the induction heating device or absence of the object from the induction heating device.

3. The induction heating device of claim 2, wherein the determination unit is further configured to:
   compare the first resonant current value to a second reference value; and
   based on a comparison of the first resonant current value to the second reference value, determine whether the object on the induction heating device has the inductive-heating property.

4. The induction heating device of claim 3, wherein the reference value is a third reference value that is different from the first reference value and the second reference value.

5. The induction heating device of claim 2, wherein the control unit is further configured to, based on the determination unit determining absence of the object from the induction heating device, stop supplying the control signal to the inverter driving unit.

6. The induction heating device of claim 1, wherein the determination unit is further configured to, in response to the determination that the object has the inductive-heating property based on the first resonant current value, determine the difference between the first resonant current value and the second resonant current value.

7. The induction heating device of claim 1, wherein the control unit is further configured to, based on the determination unit determining that the object on the induction heating device does not have the inductive-heating property, stop supplying the control signal to the inverter driving unit.

8. The induction heating device of claim 1, wherein the determination unit is further configured to determine that the object has the inductive-heating property based on the difference between the first resonant current value and the second resonant current value being less than the reference value.

9. The induction heating device of claim 1, further comprising a sensor connected to the determination unit and configured to measure a resonant current from the working coil based on operation of the inverter driving unit.

10. A method for detecting and identifying an object disposed on an induction heating device, the method comprising:
   operating an inverter of the induction heating device at a first operation frequency;
   measuring a first resonant current value from a working coil based on operation of the inverter at the first operation frequency;
   based on the first resonant current value, determining at least one of presence of the object on the induction heating device, absence of the object from the induction heating device, or a type of the object on the induction heating device;
   operating the inverter of the induction heating device at a second operation frequency;
   measuring a second resonant current value from the working coil based on operation of the inverter at the second operation frequency; and
   determining the type of the object based on the second resonant current value,
   wherein determining the type of the object comprises:
      based on the first resonant current value, determining whether the object on the induction heating device has an inductive-heating property, and
      in response to a determination that the object has the inductive-heating property based on the first resonant current value, comparing a difference between the first resonant current value and the second resonant current value to a reference value to confirm that the object has the inductive-heating property.

11. The method of claim 10, wherein determining at least one of presence of the object, absence of the object, or the type of the object comprises:
   comparing the first resonant current value to a first reference value; and
   based on a comparison of the first resonant current value to the first reference value, determining presence of the object on the induction heating device or absence of the object from the induction heating device.

12. The method of claim 11, wherein determining at least one of presence of the object, absence of the object, or the type of the object comprises:
   comparing the first resonant current value to a second reference value; and
   based on a comparison of the first resonant current value to the second reference value, determining whether the object on the induction heating device has the inductive-heating property.

13. The method of claim 12, wherein determining presence or absence of the object on the induction heating device comprises:
   determining presence of the object based on the first resonant current value being greater than or equal to the first reference value;
   determining absence of the object based on the first resonant current value being less than the first reference value; and
   based on the first resonant current value being between the first reference value and the second reference value, determining that the object is present on the induction heating device and that the object has the inductive-heating property,
   wherein the second reference value is greater than the first reference value.

14. The method of claim 12, wherein operating the inverter of the induction heating device at the second operation frequency comprises operating the inverter of the induction heating device at the second operation frequency in response to a determination that the first resonant current value being less than the second reference value.

15. The method of claim 12, wherein the reference value is a third reference value that is different from the first reference value and the second reference value.

16. The method of claim 10, wherein determining the type of the object further comprises, in response to the determination that the object has the inductive-heating property based on the first resonant current value, determining the difference between the first resonant current value and the second resonant current value.

17. The method of claim 10, further comprising operating the inverter of the induction heating device based on a confirmation that the object has the inductive-heating property.

18. The method of claim 10, further comprising determining that the object has the inductive-heating property based on the difference between the first resonant current value and the second resonant current value being less than the reference value.

19. The method of claim 10, further comprising restricting operation of the inverter based on a determination of absence of the object from the induction heating device.

20. The method of claim 10, further comprising restricting operation of the inverter based on a determination that the object on the induction heating device does not have the inductive-heating property.

* * * * *